US010393042B2

(12) United States Patent
Stief et al.

(10) Patent No.: US 10,393,042 B2
(45) Date of Patent: Aug. 27, 2019

(54) METHODS AND SYSTEM FOR PARTIAL CYLINDER DEACTIVATION

(71) Applicant: Ford Global Technologies, LLC, Dearborn, MI (US)

(72) Inventors: Juergen Stief, Aachen (DE); Werner Willems, Aachen (DE); Guohui Chen, Aachen (DE); Claudia Herudek, Aachen (DE); Frank Wunderlich, Herzogenrath (DE); Christian Vigild, Aldenhoven (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/937,671

(22) Filed: Mar. 27, 2018

(65) Prior Publication Data

US 2018/0347487 A1 Dec. 6, 2018

(30) Foreign Application Priority Data

Jun. 1, 2017 (DE) ........................ 10 2017 209 323

(51) Int. Cl.

| | |
|---|---|
| ***F02D 41/00*** | (2006.01) |
| ***F02D 9/02*** | (2006.01) |
| *F02M 26/52* | (2016.01) |
| *F02B 35/00* | (2006.01) |
| *F01L 13/00* | (2006.01) |
| *F02D 9/04* | (2006.01) |
| *F02D 17/00* | (2006.01) |

(52) U.S. Cl.

CPC ........... *F02D 41/0087* (2013.01); *F02D 9/02* (2013.01); *F02D 41/0002* (2013.01); *F02D 41/0082* (2013.01); *F01L 2013/001* (2013.01); *F02B 35/00* (2013.01); *F02D 9/04* (2013.01); *F02D 17/00* (2013.01); *F02D 2009/0272* (2013.01); *F02D 2009/0279* (2013.01); *F02M 26/52* (2016.02)

(58) Field of Classification Search

CPC ...... F01L 2013/001; F02B 35/00; F02D 9/02; F02D 2009/0272; F02D 2009/0279; F02D 9/04; F02D 17/00; F02D 17/02; F02D 41/0002; F02D 41/0082; F02M 26/52; F02M 26/55; F02M 26/64

USPC ................ 60/278, 315, 324; 123/481, 198 F

See application file for complete search history.

(56) References Cited

U.S. PATENT DOCUMENTS

| | | | | |
|---|---|---|---|---|
| 2,623,617 A * | 12/1952 | Snyder | .................... F02D 17/02 123/184.39 |
| 4,391,240 A | 7/1983 | Sugasawa et al. | |
| 2014/0331667 A1 | 11/2014 | Kindl et al. | |
| 2016/0053697 A1 | 2/2016 | Pirjaberi et al. | |

(Continued)

FOREIGN PATENT DOCUMENTS

| | | |
|---|---|---|
| DE | 3000374 A1 | 7/1980 |
| DE | 3007370 A1 | 9/1980 |

(Continued)

*Primary Examiner* — Jorge L Leon, Jr.

(74) *Attorney, Agent, or Firm* — Julia Voutyras; McCoy Russell LLP

(57) ABSTRACT

Methods and systems are provided for reducing pumping losses during a partial deactivation. In one example, a method may include applying negative pressure to a deactivated cylinder group to remove gases trapped therein while an activated cylinder group continues to combust.

20 Claims, 4 Drawing Sheets

(56) References Cited

U.S. PATENT DOCUMENTS

| | | | | |
|---|---|---|---|---|
| 2016/0215711 | A1 | 7/2016 | Dudar | |
| 2017/0030279 | A1* | 2/2017 | Bartsch | F02D 41/0082 |

FOREIGN PATENT DOCUMENTS

| | | | |
|---|---|---|---|
| DE | 102013210597 | A1 | 12/2013 |
| DE | 102013020880 | A1 | 6/2015 |
| DE | 102015200047 | A1 | 10/2015 |
| DE | 102014208719 | A1 | 11/2015 |

* cited by examiner

METHODS AND SYSTEM FOR PARTIAL CYLINDER DEACTIVATION

CROSS REFERENCE TO RELATED APPLICATION

This application claims priority to German Patent Application No. 102017209323.4, filed Jun. 1, 2017. The entire contents of the above-referenced application are hereby incorporated by reference in their entirety for all purposes.

FIELD

The present description relates generally to decreasing pumping losses during partial cylinder deactivation.

BACKGROUND/SUMMARY

An internal combustion engine may be used as a motor vehicle drive unit. Within the context of the present disclosure, an internal combustion engine may encompass an Otto-cycle engines but also diesel engines and hybrid internal combustion engines, which utilize a hybrid combustion process, and also hybrid drives which comprise not only the internal combustion engine but also an electric machine which can be connected in terms of drive to the internal combustion engine and which receives power from the internal combustion engine or which, as an activatable auxiliary drive, additionally outputs power.

In the development of internal combustion engines, it may be desired to decrease fuel consumption to increase efficiency. Fuel consumption and thus efficiency may pose a problem. The reason for this lies in the fundamental operating process of the Otto-cycle engine. Load control may be carried out via a throttle flap arranged in the intake system. By adjusting the throttle flap, the pressure of the inducted air downstream of the throttle flap can be adjusted. The further the throttle flap is closed, that is to say the more said throttle flap blocks the intake system, the higher the pressure loss of the inducted air across the throttle flap, and the lower the pressure of the inducted air downstream of the throttle flap and upstream of the inlet into the at least two cylinders, that is to say combustion chambers. For a constant combustion chamber volume, it is possible in this way for the air mass, that is to say the quantity, to be set based on the pressure of the inducted air. Thus, quantity regulation may be undesired, specifically in part-load operation, because low loads demand a high degree of throttling and a large pressure reduction in the intake system, as a result of which the charge exchange losses increase with decreasing load and increasing throttling.

One approach to a solution for dethrottling the Otto-cycle engine is for example an Otto-cycle engine operating process with direct injection. The direct injection of the fuel may realize a stratified combustion chamber charge. The direct injection of the fuel into the combustion chamber may permit regulation in the Otto-cycle engine, within certain limits. The mixture formation takes place by the direct injection of the fuel into the cylinders or into the air situated in the cylinders, and not by external mixture formation, in which the fuel is introduced into the inducted air in the intake system. However, fuel/air mixing may not sufficiently mix at all engine operating conditions.

Another approach to a solution for dethrottling the Otto-cycle engine comprise in the use of an at least partially variable valve drive. By contrast to invariable valve drives, in which both the lift of the valves and the control timing are invariable, these parameters which have an influence on the combustion process, and thus on fuel consumption, can be varied to a greater or lesser extent via variable valve drives. If the closing time of the inlet valve and the inlet valve lift can be varied, then throttling-free and thus loss-free load control may be possible. The mixture mass which flows into the combustion chamber during the intake process is then controlled via a throttle flap but rather via the inlet valve lift and the opening duration of the inlet valve. Variable valve drives may be expensive and are therefore often undesired for mass production.

A further approach to a solution for dethrottling the Otto-cycle engine may include cylinder deactivation, that is to say the deactivation of individual cylinders in certain load ranges. The efficiency of the Otto-cycle engine in part-load operation may be improved, that is to say increased, via partial deactivation of at least one cylinder of a multi-cylinder internal combustion engine which may increase the load on the other cylinders, which remain in operation, if the engine power remains constant, such that the throttle flap may be opened further to introduce a greater air mass into operating cylinders, whereby dethrottling of the internal combustion engine is attained overall. During the partial deactivation, the cylinders which are permanently operational (e.g., may not be deactivated) operate in the region of higher loads, at which the specific fuel consumption is lower. The load collective of the operational cylinders is shifted toward higher loads.

The operating (e.g., combusting) cylinders during the partial deactivation furthermore exhibit increased air/fuel mixing owing to the greater air mass or mixture mass supplied, and tolerate higher exhaust-gas recirculation rates. Furthermore, the deactivated (e.g., non-combusting) cylinder increases in efficiency, as heat losses due to heat transfer between combustion gases and combustion chamber walls are reduced and/or eliminated.

It will be appreciated that diesel engines may experience similar benefits from cylinder deactivation. More specifically, the partial deactivation may at least partially prevent a diesel fuel-air mixture from becoming too lean in the context of the quality regulation in the presence of decreasing load as a result of a reduction of the fuel quantity used.

However, the inventors herein have recognized potential issues with such systems. As one example, pumping losses may occur in the deactivated cylinders, which may decrease an overall power output of the engine, thereby decreasing overall fuel efficiency. Said another way, the deactivated cylinders continue to participate in a charge exchange, wherein the deactivated cylinders continue to compress intake air. As described above, these pumping losses may be remedied via switchable valve drive, such as a variable valve drive. However, these solutions are expensive and demand complex electrical connections which are prone to degradation.

To decrease the cost, it may be desired for switchable or adjustable valve drives to be arranged at the inlet side and at the outlet side, where valve drives of the deactivated cylinders are held closed, and thus no longer participate in the charge exchange, during the partial deactivation. In this way, a situation is also prevented in which the relatively cool charge air conducted through the deactivated cylinders reduces the enthalpy of the exhaust-gas flow provided to the turbine and causes the deactivated cylinders to rapidly cool down.

Furthermore, in the case of internal combustion engines supercharged via exhaust-gas turbocharging, switchable valve drives can lead to further problems because the turbine of an exhaust-gas turbocharger is configured for a certain exhaust-gas flow rate above a threshold, and thus generally also for a certain number of cylinders. If the valve drive of a deactivated cylinder is deactivated, the total mass flow through the cylinders of the internal combustion engine is initially reduced. The exhaust-gas mass flow conducted through the turbine decreases, and the turbine pressure ratio generally also decreases as a result. A decreasing turbine pressure ratio has the effect that the charge pressure ratio likewise decreases, that is to say the charge pressure falls, and less charge air is or can be supplied to the cylinders that remain operational.

It may be desired for the charge pressure to be increased to supply more charge air to the cylinders that remain operational, because in the event of deactivation of at least one cylinder of a multi-cylinder internal combustion engine, the load on the other cylinders, which remain operational, increases, for which reason a greater amount of charge air and a greater amount of fuel may be supplied to said cylinders. The drive power available at the compressor for generating an adequately high charge pressure is dependent on the exhaust-gas enthalpy of the hot exhaust gases, which may determined by the exhaust-gas pressure and the exhaust-gas temperature, and the exhaust-gas mass or the exhaust-gas flow.

By opening the throttle flap, the charge pressure may be increased in the load range relevant for partial deactivation. This possibility may not exist in the case of the diesel engine. The small charge-air flow may have the effect that the compressor operates beyond the surge limit.

The effects described above may lead to a restriction of the practicability of the partial deactivation, specifically to a restriction of the engine speed range and of the load range in which the partial deactivation can be used. In the case of low charge-air flow rates, it may not be desired owing to inadequate compressor power or turbine power, for the charge pressure to be increased in accordance with demand.

The charge pressure during partial deactivation, and thus the charge-air flow rate supplied to the cylinders that remain operational, may for example be increased via a small configuration of the turbine cross section and via simultaneous exhaust-gas blow-off, whereby the load range relevant for a partial deactivation may also be expanded again. However, the supercharging behavior may be inadequate when all the cylinders are operated, which may decrease power output and/or fuel economy.

The charge pressure during partial deactivation, and thus the charge-air flow rate supplied to the cylinders that are still operational, may also be increased by virtue of the turbine being equipped with a variable turbine geometry, which permits an adaptation of the effective turbine cross section to the present exhaust-gas mass flow. The exhaust-gas back pressure in the exhaust-gas discharge system upstream of the turbine would then however simultaneously increase, leading in turn to higher charge-exchange losses in the cylinders that are still operational.

In the internal combustion engine according to the present disclosure, the cylinders of a second group (e.g., inner cylinders) are not equipped with deactivatable valve drives either at the inlet side or at the outlet side. Rather, the deactivated cylinders continue to participate in the charge exchange, that is to say the valves oscillate, during the partial deactivation. The internal combustion engine to which the present disclosure relates however may comprise at least one shut-off element at the inlet side and at the outlet side to optionally prevent the supply of fresh air to the deactivated cylinders and the discharge of exhaust gas from the deactivated cylinders. During the partial deactivation, the piston of a deactivated cylinder draws gas in via the at least one inlet opening and forces gas out via the at least one outlet opening. The gas is however enclosed, that is to say trapped, between the shut-off element arranged at the inlet side and the shut-off element arranged at the outlet side. This may solve the charge losses incurred and/or accepted in the previous examples described above.

In one example, the issues described above may be addressed by an internal combustion engine comprising at least one cylinder head with at least two cylinders, in which each cylinder of the two cylinders has at least one inlet opening fluidly coupled to an intake line for the supply of fresh air via an intake system, each cylinder has at least one outlet opening fluidly coupled to an exhaust line for the discharge of the exhaust gases via an exhaust-gas discharge system, the at least two cylinders form a first cylinder group and a second cylinder group, the first cylinder group comprising at least a first cylinder and the second cylinder group comprising at least a second cylinder different than the first, where the first cylinder is not switchable and the second cylinder is switchable, the intake system comprising a primary shut-off element configured to adjust fresh air flow to each of the first and second cylinder groups and a secondary shut-off element configured to adjust fresh air flow to only the second cylinder group, via which the supply of fresh air to the at least one cylinder of the second group can be stopped, a second cylinder group exhaust line is equipped with at least one exhaust shut-off element configured to adjust exhaust gas flow from the second cylinder group exhaust line to the exhaust-gas discharge system, and a negative-pressure source fluidly coupled to at least the second cylinder group exhaust line, where a negative-pressure line fluidly coupling the negative pressure source is connected to the second cylinder group exhaust line at a position between the exhaust shut-off element and the second cylinder. In this way, the gas of a deactivated cylinder that has been enclosed or trapped between the at least one shut-off element of the intake system of the second group and the at least one shut-off element of the exhaust-gas discharge system of the second group during partial deactivation is at least partially extracted by suction, that is to say evacuated or discharged, via a negative-pressure line.

As one example, the gases situated in a cylinder that is deactivated during the partial deactivation poses less resistance to the oscillating piston of the deactivated cylinder during the intake, exhaust and compression. In this way, the charge-exchange losses of the second cylinder group during partial deactivation may be reduced and fuel economy may be increased. The at least one negative-pressure line of the internal combustion engine according to the disclosure branches off between the at least one shut-off element of the intake system of the second group and the at least one shut-off element of the exhaust-gas discharge system of the second group, and is connectable or connected to a negative-pressure source, for example a vacuum pump. A shut-off element associated with the line serves for opening up and closing off the negative-pressure line.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
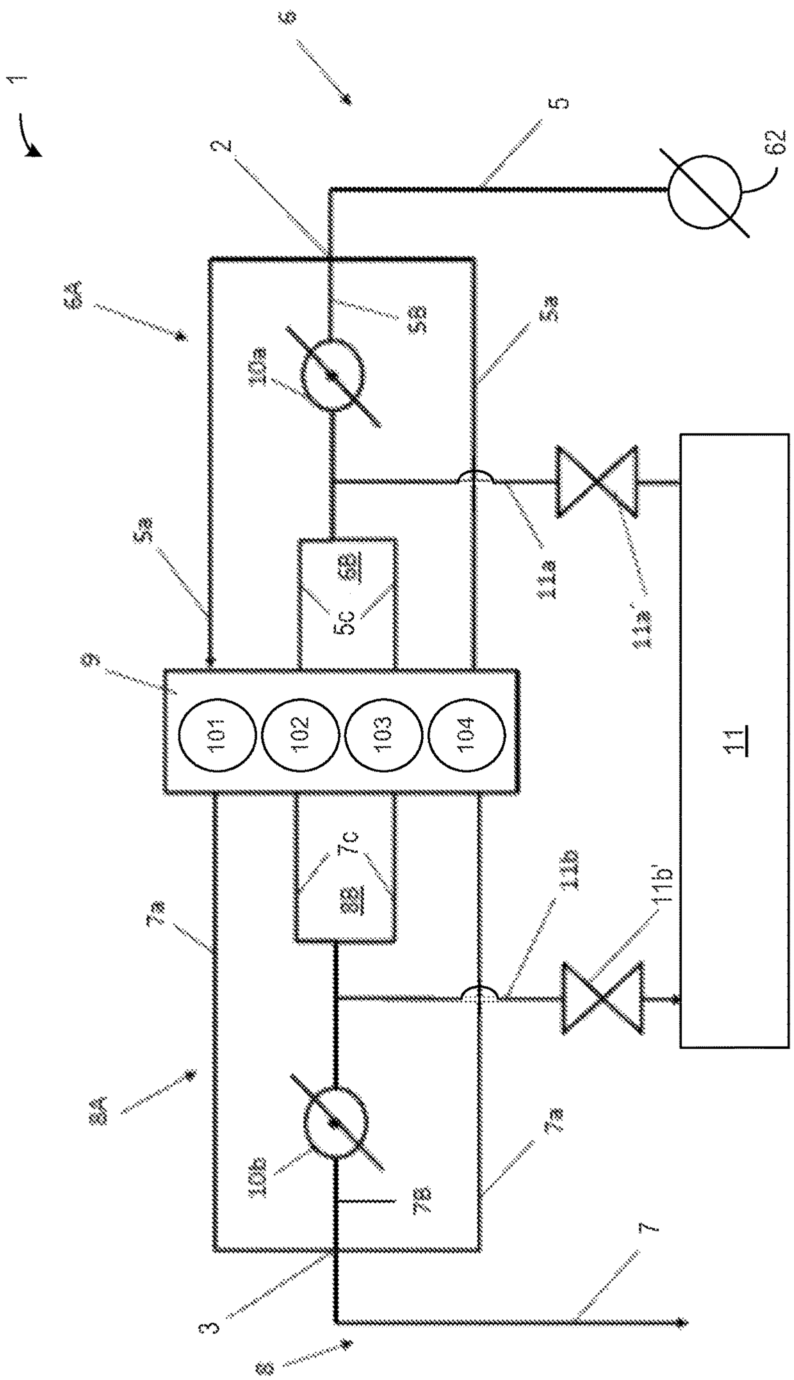
FIG. 1 shows a first embodiment of an internal combustion engine.
Figure 2:
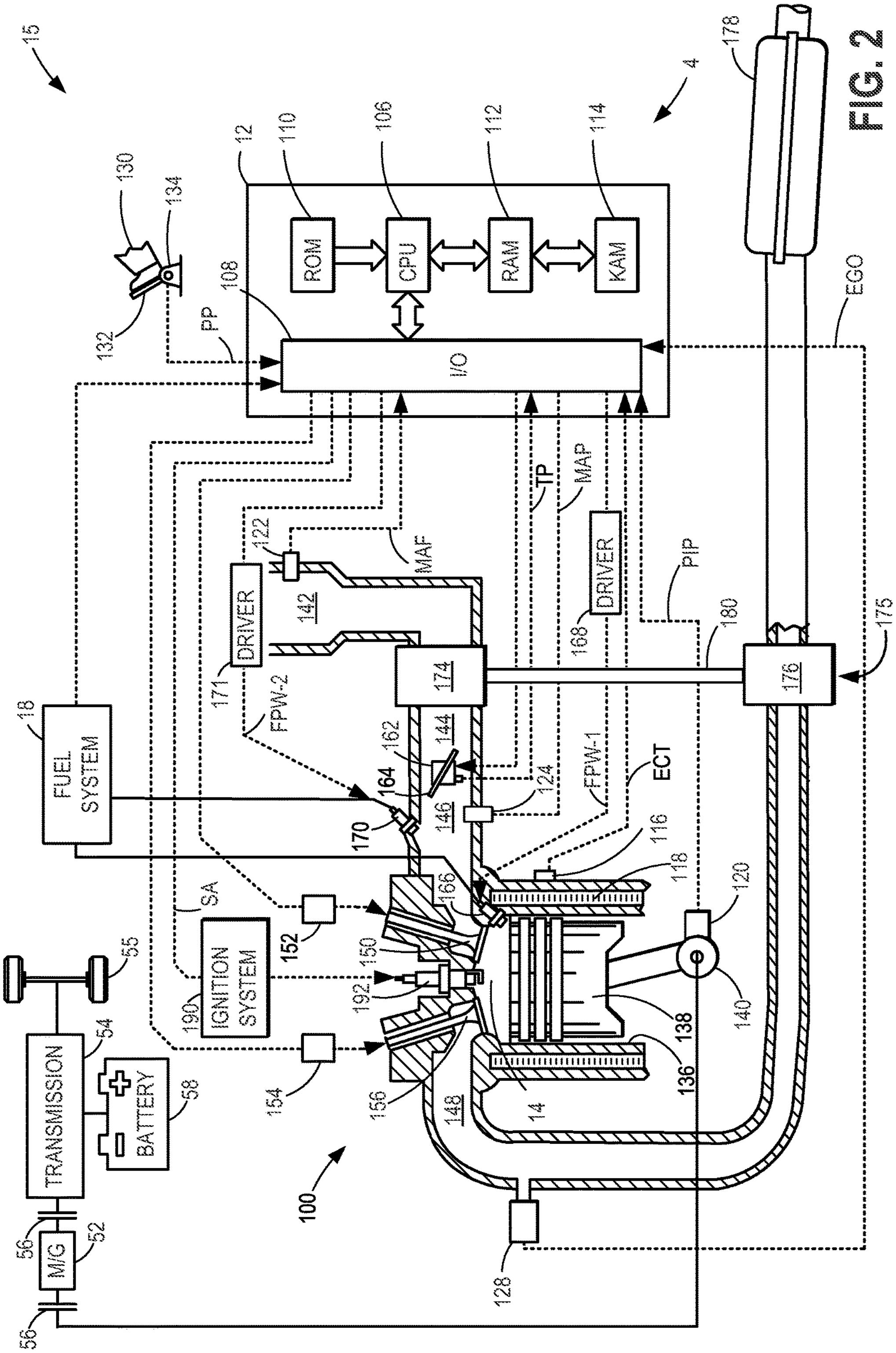
FIG. 2 shows a schematic of a single cylinder of the internal combustion engine.
Figure 3:
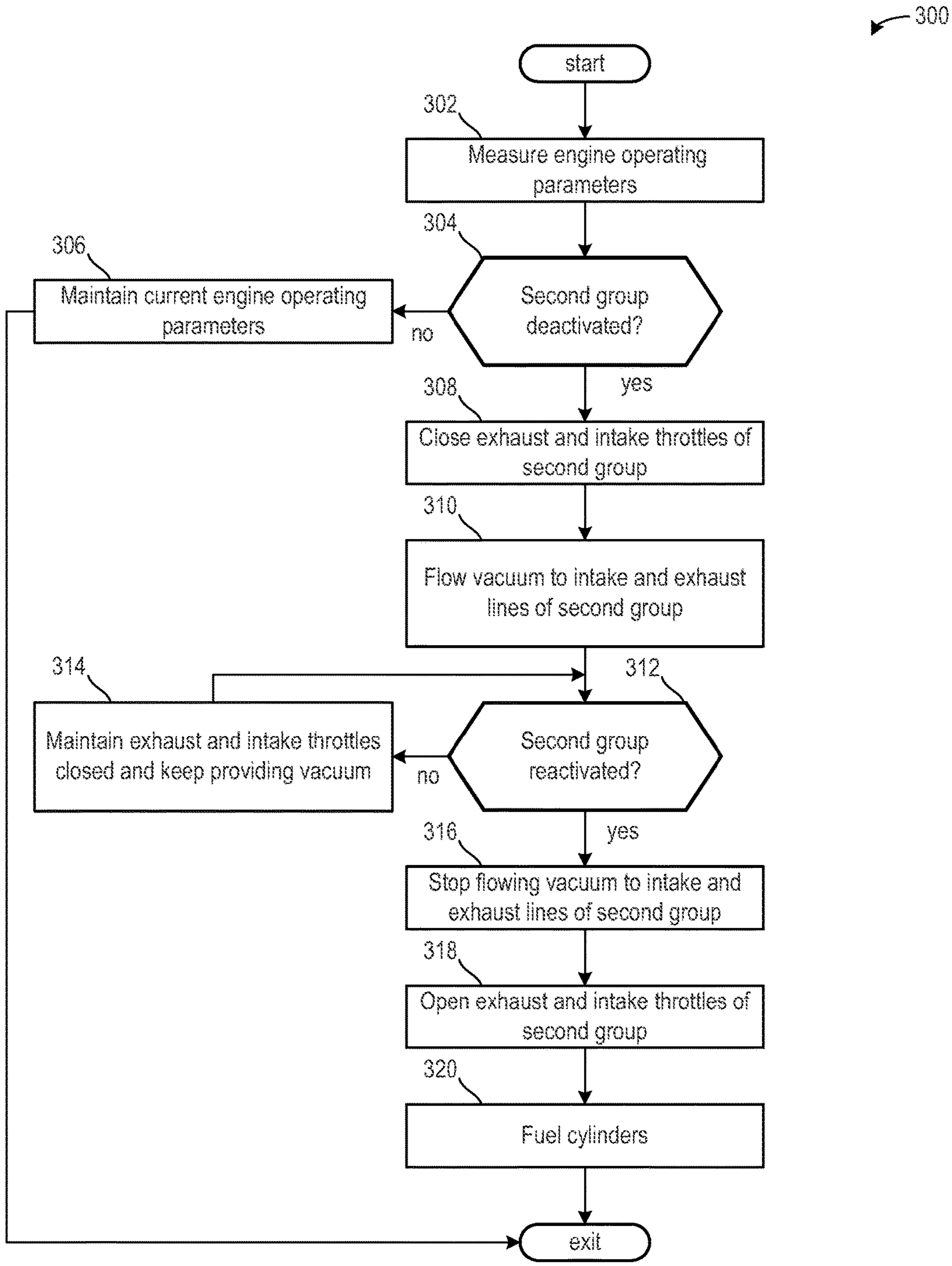
FIG. 3 shows a method for operating the internal combustion engine during a partial deactivation.
Figure 4:
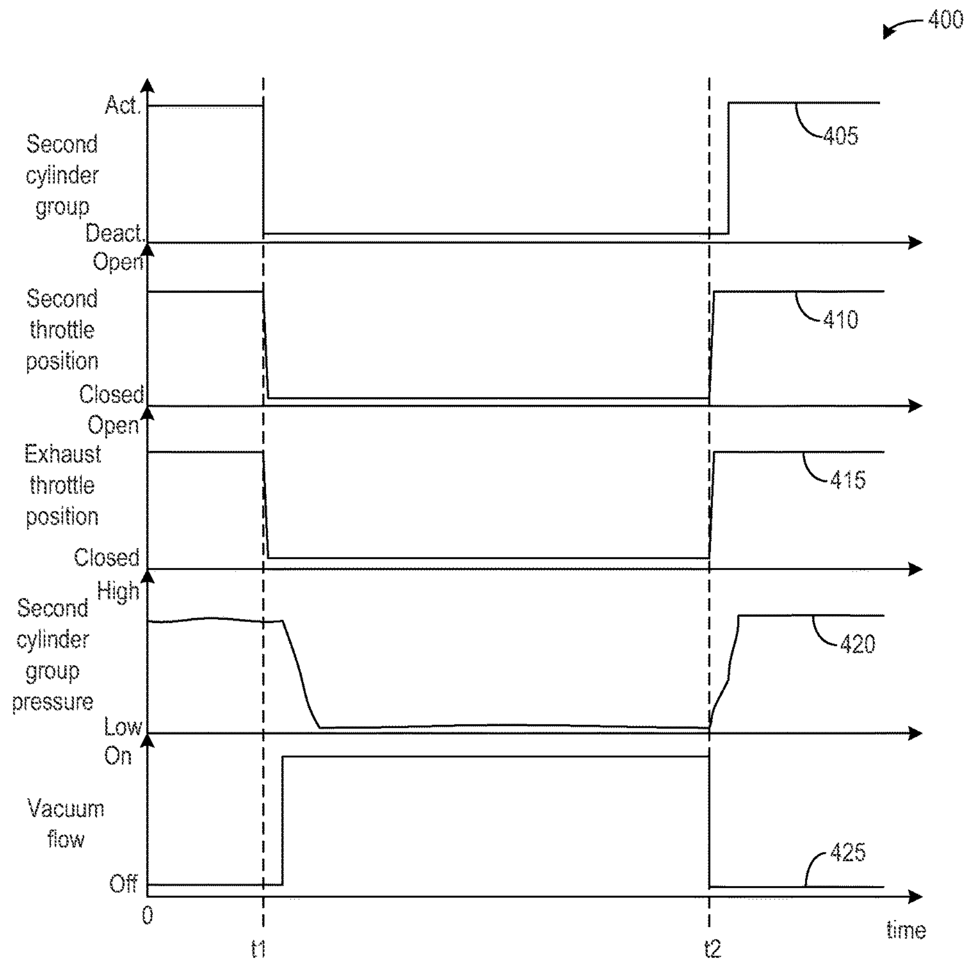
FIG. 4 shows an engine operating sequence illustrating the method of FIG. 3 being executed in combination with the internal combustion engine.

The following description relates to systems and methods for removing charge air from at least one deactivated cylinder of an engine. More specifically, the engine may include a first cylinder group and a second group, wherein each of the first and second cylinder groups comprise at least one cylinder. The cylinders of the first and second cylinder groups may be operated differently such that the at least one cylinder of the first group may be combusting and the at least one cylinder of the second group may be deactivated. Intake and exhaust throttles may correspond to the at least one cylinder of the second group such that charge air may be trapped between the intake and exhaust throttles. A vacuum may be applied between the intake and exhaust throttles to remove charge air trapped therein, to decrease pumping losses during partial-deactivation conditions of the engine. An example of the engine is shown in FIGS. 1 and 2. A method for operating the first and second groups of cylinders, along with a vacuum source and the intake and exhaust throttle of the second group are shown in FIG. 3. An engine operating sequence illustrating the method of FIG. 3 being operated in conjunction with the engine illustrated in FIGS. 1 and 2 is shown in FIG. 4.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

The internal combustion engine according to the present disclosure may comprise at least two cylinders or at least two groups with in each case at least one cylinder corresponds to each of the groups. In this respect, internal combustion engines with three cylinders which are configured in three groups each comprising one cylinder, or internal combustion engines with six cylinders which are configured in three groups each comprising two cylinders, are likewise internal combustion engines according to the disclosure. Within the context of a partial deactivation, the three cylinder groups may be activated or deactivated in succession, whereby twofold switching may also be realized. The partial deactivation is thereby further optimized. The cylinder groups may also comprise a different number of cylinders. In this respect, an internal combustion engine having three cylinders configured in two groups is also an internal combustion engine according to the disclosure.

In some embodiments according to the disclosure of the internal combustion, the engine permits an optimization of the efficiency of the internal combustion engine in part-load operation, that is to say at low loads, wherein a low load $T_{low}$ is preferably a load which amounts to less than 65% or 50% or at least less than 30%, of the maximum load $T_{max,n}$ at the present engine speed n.

In some embodiments, additionally or alternatively, intake lines of the at least one cylinder of a second group merge, with the formation of an inlet manifold, to form an overall intake line, and the inlet manifold of the second group, a second inlet manifold, is equipped with at least one shut-off element which during partial deactivation of the internal combustion engine the supply of fresh air to the at least one cylinder of the second group can be adjusted.

The merging of the intake lines of the second cylinder group to form an overall intake line shortens the length of the intake lines overall, and considerably reduces the volume of the associated intake system. Furthermore, packaging restraints of the intake system may be reduced, and a compact design of the internal combustion engine is realized.

In internal combustion engines in which the second group comprises only one cylinder, the merging of intake lines to form an overall intake line, with the formation of an inlet manifold, may be omitted if the deactivatable cylinder has only one inlet opening. Then, the single intake line of the deactivatable cylinder forms the overall intake line and the inlet manifold of the second group.

In this context, embodiments of the internal combustion engine are advantageous in which a shut-off element is arranged in the overall intake line of the second inlet manifold.

In the present case, the shut-off element is arranged in the overall intake line of the second inlet manifold. In this embodiment, a single shut-off element is sufficient to stop the fresh-air supply to the deactivated cylinders.

It is also possible for a shut-off element to be provided in each intake line of a deactivatable cylinder, though this increases the number of shut-off elements and may increase a manufacturing cost and increase packaging restraints.

In this context, embodiments of the internal combustion engine may include a negative-pressure line and/or vacuum, which is at least connectable to the negative-pressure source and in which a shut-off element is arranged, branches off between the shut-off element in the overall intake line of the second inlet manifold and the at least one cylinder of the second group.

In the present case, a negative-pressure line branches off at the inlet side from the intake system, for example, from the overall intake line of the second inlet manifold, specifically downstream of the shut-off element arranged in the second overall intake line, that is to say between the shut-off element in the second overall intake line and the at least one cylinder of the second group, relative to a direction of intake air flow.

Some embodiments of the internal combustion engine may comprise where the exhaust lines of the at least one cylinder of the second group merge, with the formation of an outlet manifold, to form an overall exhaust line, and the outlet manifold of the second group, as second outlet manifold, is equipped with at least one shut-off element via which during partial deactivation of the internal combustion engine, the discharge of exhaust gas from the at least one cylinder of the second group may be adjusted.

That which has already been stated for the merging of the intake lines applies analogously. That is to say, the exhaust lines may be merged similarly to the intake lines as described above. The length of the exhaust lines overall may be shortened, and the volume of the associated exhaust-gas discharge system may be reduced. Furthermore, the structural space of the exhaust system is reduced, and a compact design of the internal combustion engine is realized.

In internal combustion engines in which the second group comprises only one cylinder, the merging of exhaust lines to form an overall exhaust line, with the formation of an outlet manifold, may be omitted if the deactivatable cylinder has only one outlet opening. Then, the single exhaust line of the deactivatable cylinder forms the overall exhaust line and the outlet manifold of the second group.

In this context, embodiments of the internal combustion may comprise a shut-off element arranged in the overall exhaust line of the second outlet manifold. In the present case, the shut-off element is arranged in the overall exhaust line of the second outlet manifold. In this embodiment, a single shut-off element may be sufficient to adjust the discharge of exhaust gas from the deactivated cylinders.

It is also possible for a shut-off element to be provided in each exhaust line of a deactivatable cylinder, while this increases the number of shut-off elements desired if a deactivatable cylinder has more than one outlet opening and/or the second group comprises more than one deactivatable cylinder, it may increase a degree of control and/or metering of exhaust gases expelled from the deactivatable cylinder.

In this context, embodiments of the internal combustion engine may comprise a negative-pressure line, which is at least connectable to the negative-pressure source and in which a shut-off element is arranged, branches off between the shut-off element in the overall exhaust line of the second outlet manifold and the at least one cylinder of the second group.

In the present case, a negative-pressure line branches off at the outlet side from the exhaust-gas discharge system, for example, from the overall exhaust line of the second outlet manifold, specifically upstream of the shut-off element arranged in the second overall exhaust line, that is to say between the shut-off element in the second overall exhaust line and the at least one cylinder of the second group.

Embodiments of the internal combustion engine may comprise where the at least one inlet-side shut-off element and/or the at least one outlet-side shut-off element is a valve.

Embodiments of the internal combustion engine may comprise where the at least one inlet-side shut-off element and/or the at least one outlet-side shut-off element is a pivotable flap.

Embodiments of the internal combustion engine are advantageous in which the at least one shut-off element is continuously adjustable. The embodiment of the shut-off element as a continuously adjustable shut-off element permits controlled dosing of the fresh-air flow rate introduced into the cylinders of the second group, if said cylinders are not deactivated but are in fired operation. The metering of the fresh-air flow rate may be performed in an operating-point-specific manner, in particular with regard to the lowest possible charge-exchange losses. The control of the shut-off element may take into consideration the load T, the engine speed n, the coolant temperature in the case of a liquid-cooled internal combustion engine, the oil temperature and/or the like.

Nevertheless, embodiments of the internal combustion engine may comprise where the at least one shut-off element is switchable in at least two-stage fashion, that is to say is if appropriate switchable in multi-stage fashion.

The shut-off element may be electrically, hydraulically, pneumatically, mechanically or magnetically controllable via a signal sent by an engine controller. The controller may comprise instructions stored on non-transitory memory thereof that when executed enable the controller to adjust the shut-off element.

In some embodiments, the internal combustion engine may comprise a supercharging arrangement. Supercharging may increase power in which the charge air used for the combustion process in the engine is compressed, as a result of which a greater charge air mass may be fed to each cylinder in each working cycle. In this way, the fuel mass and therefore the mean pressure can be increased.

Supercharging may increase the power of an internal combustion engine while maintaining an unchanged swept volume, or for reducing the swept volume while maintaining the same power. In all cases, supercharging may lead to an increase in volumetric power output and a more expedient power-to-weight ratio. If the swept volume is reduced, it is possible, given the same vehicle boundary conditions, to shift the load collective toward higher loads, at which the specific fuel consumption is lower. Supercharging of an internal combustion engine consequently assists in the efforts to minimize fuel consumption, that is to say to improve the efficiency of the internal combustion engine.

In some embodiments, a transmission configuration coupled to the engine may provide downspeeding, whereby a lower specific fuel consumption is likewise achieved. In the case of downspeeding, use is made of the fact that the specific fuel consumption at low engine speeds is generally lower, in particular in the presence of relatively high loads.

Supercharged internal combustion engines may comprise a charge-air cooling arrangement configured to cool charged air before it enters the at least two cylinders. In this way, the density of the supplied charge air is increased further. In this way, the cooling likewise contributes to a compression and improved charging of the combustion chambers, that is to say to an improved volumetric efficiency. The charge-air cooler may be equipped with a bypass line in order to be able to bypass the charge-air cooler if desired, for example during a cold start.

For supercharging, use may be made of an exhaust-gas turbocharger, in which a compressor and a turbine are arranged on the same shaft. The hot exhaust-gas flow is fed to the turbine and expands in the turbine with a release of energy, as a result of which the shaft is set in rotation. The energy supplied by the exhaust-gas flow to the shaft is used for driving the compressor which is likewise arranged on the shaft. The compressor delivers and compresses the charge air supplied to it, as a result of which supercharging of the at least one cylinder is obtained.

Therefore, embodiments of the internal combustion engine may comprise where at least one exhaust-gas turbocharger is provided which comprises a turbine arranged in the exhaust-gas discharge system and a compressor arranged in the intake system.

A supercharger, which may be driven via an auxiliary drive, differs from an exhaust-gas turbocharger in that the exhaust-gas turbocharger utilizes the exhaust-gas energy of the hot exhaust gases, whereas a supercharger draws the energy needed for driving it directly or indirectly from the internal combustion engine and thus adversely affects, that is to say reduces, the efficiency, at least for as long as the drive energy does not originate from an energy recovery source.

If the supercharger is not one that can be driven via an electric machine, that is to say electrically, a mechanical or kinematic connection for power transmission may be used between the supercharger and the internal combustion engine.

A benefit of a supercharger in relation to an exhaust-gas turbocharger consists is that the supercharger can generate, and make available, a desired charge pressure during a wider range of operating conditions, specifically regardless of the operating state of the internal combustion engine, in particular regardless of the present rotational speed of the crankshaft. This applies in particular to a supercharger which can be driven electrically via an electric machine.

In the previous examples, it is specifically the case that difficulties are encountered in achieving an increase in power in all engine speed ranges via exhaust-gas turbocharging. A relatively severe torque drop is observed in the event of a certain engine speed being undershot. Said torque drop is understandable when considering that the charge pressure ratio is dependent on the turbine pressure ratio. If the engine speed is reduced, this leads to a smaller exhaust-gas mass flow and therefore to a lower turbine pressure ratio. Consequently, toward lower engine speeds, the charge pressure ratio likewise decreases. This equates to a torque drop.

The torque characteristic of a supercharged internal combustion engine may be improved through various measures, for example by virtue of a plurality of superchargers, exhaust-gas turbochargers and/or mechanical superchargers, being provided in a parallel and/or series arrangement.

In the case of the internal combustion engine according to the disclosure, it would for example be possible for a first compressor to be provided in the first overall intake line and a second compressor to be provided in the second overall intake line.

In the case of internal combustion engines having four cylinders in an in-line arrangement, embodiments may comprise that the two outer cylinders and the two inner cylinders form in each case one group.

In the case of internal combustion engines having three cylinders in an in-line arrangement, embodiments may comprise where the two outer cylinders and the inner cylinder form in each case one group.

Embodiments of the internal combustion engine may comprise where each cylinder has at least two inlet openings which are adjoined by intake lines for the supply of fresh air via the intake system.

During the charge exchange, the charging of the combustion chambers with fresh mixture or fresh air takes place via the inlet openings. The valve drive may open and close the inlet openings at desired times, wherein rapid opening of the largest possible flow cross sections is sought in order to keep the throttling losses low and ensure the best possible charging of the combustion chambers. In this connection, it is expedient for the cylinders to be provided with two or more inlet openings.

Embodiments of the internal combustion engine may comprise where each cylinder has at least two outlet openings which are adjoined by exhaust lines for the discharge of exhaust gas via the exhaust-gas discharge system. That which has been stated above for the inlet openings applies analogously.

Embodiments of the internal combustion engine are advantageous in which a vacuum pump serves as negative-pressure source. The vacuum pump may be an existing vacuum pump which already performs another function, or else may be a vacuum pump provided exclusively for the concept according to the disclosure.

Embodiments of the internal combustion engine may comprise a negative-pressure region of the intake system serves as negative-pressure source.

Embodiments of the internal combustion engine may comprise a cylinder operating in an intake phase of the first group serves as negative-pressure source.

Embodiments of the internal combustion engine may comprise where each cylinder is equipped with a direct-injection injector for the introduction of fuel.

Here, embodiments are advantageous in which each cylinder is equipped with an injection nozzle for the purposes of direct injection.

The fuel supply can be deactivated more quickly and more reliably, for the purposes of the partial deactivation, in the case of direct-injection internal combustion engines than in the case of internal combustion engines with intake pipe injection, in which fuel residues in the intake pipe may lead to undesired combustions in the deactivated cylinder.

Nevertheless, embodiments of the internal combustion engine may comprise an intake pipe injection element is provided for the purposes of supplying fuel.

Another embodiment of the present disclosure may include a method for operating an internal combustion engine of a type described above, is achieved via a method in which the at least one switchable cylinder of the second group is switched in a manner dependent on the load T of the internal combustion engine in such a way that said at least one switchable cylinder is deactivated in the event of a predefinable load $T_{down}$ being undershot and is activated in the event of a predefinable load $T_{up}$ being overshot, provision being made whereby, during the partial deactivation, the supply of fresh air to the at least one deactivated cylinder of the second group and the discharge of exhaust gas from the at least one deactivated cylinder of the second group are prevented by actuation of the shut-off element, and the at least one negative-pressure line is, by virtue of the associated shut-off element being opened, at least partially opened up and connected to the negative-pressure source for the purposes of reducing the charge-exchange losses during partial deactivation.

The limit loads $T_{down}$ and $T_{up}$ predefined for the undershooting and exceedance respectively may be of equal magnitude, though may also differ in magnitude. When the internal combustion engine is operational, the cylinders of the first cylinder group are cylinders which are permanently operational. Switching of the second cylinder group, that is to say an activation and deactivation of said second group, takes place.

Method variants may comprise where at least one cylinder of the second group is deactivated when the predefined load $T_{down}$ is undershot and the present load remains lower than said predefined load $T_{down}$ for a predefinable time period $\Delta t_1$.

The introduction of an additional condition for the deactivation of the cylinders of the second group, that is to say the partial deactivation, is intended to prevent excessively frequent activation and deactivation, in particular a partial deactivation, if the load falls below the predefined load $T_{down}$ only briefly and then rises again, or fluctuates around the predefined value for the load $T_{down}$, without the undershooting justifying or necessitating a partial deactivation.

For these reasons, method variants may comprise where the at least one cylinder of the second group is activated when the predefined load $T_{up}$ is exceeded and the present load remains higher than said predefined load $T_{up}$ for a predefinable time period $\Delta t_2$.

Method variants may comprise where the fuel supply to the at least one switchable cylinder is deactivated during deactivation. This yields advantages with regard to fuel consumption and pollutant emissions, thus assisting the aim pursued by the partial deactivation, specifically that of reducing fuel consumption and improving efficiency. In the case of auto-ignition internal combustion engines, it may even be necessary to deactivate the fuel supply in order to reliably prevent an ignition of the mixture situated in the cylinder.

Additionally or alternatively, method variants may comprise where upon deactivation of the at least one load-dependently switchable cylinder, the fuel supply of the at least one switchable cylinder is firstly deactivated before the shut-off elements are actuated, and upon activation of the at least one deactivated cylinder, the shut-off elements are firstly actuated before the fuel supply of the at least one deactivated cylinder is activated.

This approach may ensure that the deactivatable cylinders are supplied with fresh air for as long as the fuel supply is active, and no fuel passes into the cylinders when the fresh-air supply is deactivated.

Embodiments of the method may comprise the predefinable load $T_{down}$ and/or $T_{up}$ is dependent on the engine speed n of the internal combustion engine. Then, there is not only one specific load, upon the undershooting or exceedance of which switching takes place regardless of the engine speed n. Instead, an engine-speed-dependent approach is followed, and a region in the characteristic map is defined in which partial deactivation takes place.

It is basically possible for further operating parameters of the internal combustion engine, for example the engine temperature or the coolant temperature after a cold start of the internal combustion engine, to be used as a criterion for a partial deactivation.

Turning now to FIG. 1, it shows a first embodiment of an internal combustion engine 1. The internal combustion engine 1 is a four-cylinder in-line engine with direct injection, in which the four cylinders 101, 102, 103, 104 are arranged along the longitudinal axis of a cylinder head 9, that is to say in a line, and are equipped in each case with an injector for injecting fuel, wherein the injected fuel quantity serves for setting the air ratio λ (not illustrated).

The four cylinders 101, 102, 103, 104 are configured to form two groups with in each case two cylinders of the cylinders 101, 102, 103, 104, wherein the two outer cylinders 101, 104 form a first cylinder group and the two inner cylinders 102, 103 form a second cylinder group.

The inner cylinders 102, 103 of the second group may be configured as switchable cylinders 102, 103 which are deactivated during a partial deactivation of the internal combustion engine. The outer cylinders 101, 104 of the first group are cylinders 101, 104 which are operational even during partial deactivation of the internal combustion engine, may not be switchable.

Fresh air is supplied to the internal combustion engine 1 via an intake system 6. Each cylinder 101, 102, 103, 104 comprises an intake line for the supply of fresh air via the intake system 6, and an exhaust line 7 for the discharge of the exhaust gases via an exhaust-gas discharge system 8. More specifically, intake system 6A corresponds to the first cylinder group and intake system 6B corresponds to the second cylinder group. Additionally, the exhaust-gas discharge 8A corresponds to the first cylinder group and the exhaust-gas discharge 8B corresponds to the second cylinder group.

Said another way, intake system 6 comprises a primary throttle 62 which is shaped to adjust an air flow rate through a primary intake passage 5. The primary intake passage 5 may trifurcate and/or divide at an intersection 2, forming first cylinder group intake passages 5A and second cylinder group intake passage 5B. A number of the first cylinder group intake passages 5A may be substantially equal to a number of cylinders in the first cylinder group. In the example of FIG. 1, there are two first cylinder group intake passages 5A.

The second cylinder group intake passage 5B may be a single passage before bifurcating and forming two of the second cylinder group intake passages 5C, where a number of the second cylinder group intake passages 5C corresponds to a number of cylinders in the second cylinder group.

The intake lines 5*a*, 5*b* of the two cylinder groups merge, in each case with the formation of a group-specific inlet manifold 6A, 6B, to form an overall intake line 5. The inlet manifold 6B of the second group, that is to say the second inlet manifold 6B, is equipped with a shut-off element 10*a* which is configured to stop the supply of fresh air to the cylinders 102, 103 of the second group during partial deactivation of the internal combustion engine. In the embodiment illustrated in FIG. 1, said inlet-side shut-off element 10*a* is arranged in the second cylinder group intake passage 5B upstream of the second inlet manifold 6B and downstream of the intersection 2.

A negative-pressure line 11*a*, in which a shut-off element 11*a*' is arranged and which is connectable to a negative-pressure source 11 by virtue of said shut-off element 11*a*' being opened. The negative-pressure line 11*a* branches off from the second cylinder group intake passage 5B between the inlet-side shut-off element 10*a* and the second inlet manifold 6B. Herein, inlet-side shut-off element 10*a* may be interchangeably referred to as secondary intake throttle 10*a*. The negative-pressure source 11 may be one or more of a brake booster, EGR valve, or other similar device which may consume vacuum to operate.

Additionally or alternatively, the negative-pressure source 11 may be a vacuum generating device, such as primary throttle 62. The vacuum generating device may be a vacuum device, such as a vacuum source. As is known by those of ordinary skill in the art, intake throttles may be shaped to produce vacuum during some positions of their movement.

Additionally or alternatively, the negative-pressure source may be a cylinder of the first cylinder group, wherein an intake stroke of cylinders 101, 104 may produce a sufficient amount of vacuum to supply vacuum to the second cylinder group intake passage 5B. At any rate, intake gases in the second cylinder group intake passage 5B, second cylinder group intake passages 5C, and the second cylinder group cylinders 102, 103 may flow to the negative pressure source 11 via the negative pressure line 11*a*.

The exhaust lines of the two cylinder groups merge, in each case with the formation of a group-specific outlet manifold 8A, 8B, to form an overall exhaust line 7. The outlet manifold 8B of the second group, that is to say the second outlet manifold 8B, is equipped with a shut-off element 10*b* which stops the discharge of exhaust gas from the cylinders 102, 103 of the second group during partial deactivation of the internal combustion engine. In the embodiment illustrated in FIG. 1, said outlet-side shut-off element 10*b* is arranged in a second cylinder group exhaust passage 7B between an intersection 3 and the second outlet manifold 8B. Herein, shut-off element 10*b* may be referred to as exhaust throttle 10*b*.

More specifically, the first cylinder group comprises first cylinder group exhaust passages 7*a* and the second cylinder group comprises second cylinder group exhaust passages 7*c*. Second cylinder group exhaust passages 7*c* merge to form the second cylinder group exhaust passage 7B. The second cylinder group exhaust passage 7B and the first cylinder group exhaust passages 7*a* may merge at the intersection 3, forming the primary exhaust passage 7.

A negative-pressure line 11*b*, in which a shut-off element 11*b*' is arranged and which may be connected to the negative-pressure source 11 by virtue of said shut-off element 11*b*' being opened, branches off from the second cylinder group exhaust passage 7B between the exhaust throttle 10*b* and the second cylinder group outlet manifold 8B of the second group.

The negative-pressure lines 11*a*, 11*b* allow the gases that are situated or trapped in the deactivated cylinders 102, 103 or the passages corresponding thereto to discharge during the partial deactivation. As a result of lowering of the gas pressure, the charge-exchange losses of the second cylinder group during partial deactivation can be reduced. In some examples, the negative-pressure line 11*a* may be omitted and vacuum may only be supplied by negative-pressure line 11*b*. Gases from the second cylinder group intake passages 5B and 5*c* may be sucked via vacuum generated by the cylinders in the second cylinder group and fed to the negative-pressure line 11*b*.

In this way, the engine 1 comprises the primary throttle 62 arranged in the primary intake passage 5, the primary throttle 62 configured to receive instructions from a controller to adjust an amount of air flowing to the engine 1. The primary intake passage 5 divides to form outer and inner intake passages corresponding to outer and inner cylinders of the engine 1. More specifically, the engine 1 may comprise the first cylinder group comprising outer cylinders 101, 104 and the second cylinder group comprising inner cylinders 102, 103. The primary intake passage 5 divided into the first cylinder group intake passages 5*a* and the second cylinder group intake passage 5*b*. The second cylinder group intake passage 5*b* comprises a secondary throttle 10*a* configured to meter an amount of air flowing to the cylinders of the second cylinder group. The second cylinder group intake passage 5*b* may split downstream of the secondary throttle 10*a* into second cylinder group intake passages 5*c*.

Similarly, the second cylinder group may comprise second cylinder group exhaust passages 7*c*, which may merge to form a single second cylinder group exhaust passage 7B. The exhaust throttle 10*b* may be arranged in the second cylinder group exhaust passage 7*b* between the intersection 3 and the second cylinder group exhaust passages 7C. First cylinder group exhaust passages 7*a* and second cylinder group exhaust passage 7B may merge at the intersection 3 to form a primary exhaust passage 7.

A vacuum generating device 11 may be fluidly coupled to the second cylinder group intake passage 5B and exhaust passage 7B. More specifically, the vacuum generating device 11 may be fluidly coupled to the second cylinder group intake passage 5B at a location between the secondary throttle 10*a* and the second cylinder group intake passages 5C. Similarly, the vacuum generating device 11 may be further coupled to the second cylinder group exhaust passage 7B at a location between the exhaust throttle 10*b* and the second cylinder group exhaust passage 7*c*. The vacuum generating device 11 may be configured to suck out gases trapped between the exhaust throttle 10*b* and the secondary throttle 10*a*. More specifically, gases trapped in the second cylinder group intake passages, exhaust passages, and cylinders during cylinder deactivation may be removed therefrom via the vacuum generating device 11. This may decrease pumping losses incurred during cylinder deactivation by the previous examples described above.

As such, a method of the engine 1 may include upon deactivating cylinders of the second cylinder group, adjusting the secondary throttle and exhaust throttle to fully closed positions. The primary throttle may be adjusted to a more closed position and the cylinders of the first cylinder group may be adjusted to correspond to a higher load. Thus, the engine may operate with cylinders of the first cylinder group combusting and cylinders of the second group deactivated, wherein the second cylinder group does not receive ambient air from the intake passage 5 or expel exhaust gas to the exhaust passage 7.

To remove the gases stored around and in the second cylinder group, a vacuum generating device may suck the gases therefrom to decrease a pressure of the second cylinder group to be substantially equal to the vacuum generating device. The vacuum may flow to the second cylinder group intake and exhaust passages by actuating the shut-off elements arranged in the negative-pressure lines to more open positions. This may increase fuel efficiency during the cylinder deactivation operation. As described above, the vacuum generating device may include one or more of a brake booster, EGR valve, primary throttle, and cylinders of the first cylinder group.

FIG. 2 depicts an example of a cylinder of internal combustion engine 100 included by engine system 4 of vehicle 15. Engine 100 may be used similarly to the engine 1 of FIG. 1. Engine 100 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder 14 (which may be referred to herein as a combustion chamber) of engine 100 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 100.

Cylinder 14 can receive intake air via a series of intake air passages 142, 144, and 146. Intake air passage 146 can communicate with other cylinders of engine 100 in addition to cylinder 14. FIG. 1 shows engine 100 configured with a turbocharger 175 including a compressor 174 arranged between intake passages 142 and 144, and an exhaust turbine 176 arranged along exhaust passage 148. Compressor 174 may be at least partially powered by exhaust turbine 176 via a shaft 180. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 100 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 100 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 100, including cylinder 14, may include at least two intake poppet valves and at least two exhaust poppet valves located at an upper region of the cylinder. Cylinder 14 may be used similarly to cylinders 101, 102, 103, or 104 of FIG. 1.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 100 may include a spark plug 192 for initiating combustion. Ignition system 190 can provide an ignition spark to cylinder 14 via spark plug 192 in response to spark advance signal SA from controller 12, under select operating modes. However, in some embodiments, spark plug 192 may be omitted, such as where engine 100 may initiate combustion by auto-ignition or by injection of fuel as may be the case with some diesel engines.

In some examples, each cylinder of engine 100 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 18. Fuel system 18 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 18 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port fuel injection (hereafter referred to as "PFI") into the intake port upstream of cylinder 14. Fuel injector 170 may inject fuel, received from fuel system 18, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Herein, operation of intake valve 150 may be described in greater detail. For example, the intake valve 150 may be moved from a fully open position to a fully closed position, or to any position therebetween. For all conditions being equal (e.g., throttle position, vehicle speed, pressure, etc.), the fully open position allows more air from the intake passage 146 to enter the cylinder 14 than any other position of the intake valve 150. Conversely, the fully closed position may prevent and/or allow the least amount of air from the intake passage 146 to enter the cylinder 14 than any other position of the intake valve 150. Thus, the positions between the fully open and fully closed position may allow varying amounts of air to flow between the intake passage 146 to the cylinder 14. In one example, moving the intake valve 150 to a more open position allows more air to flow from the intake passage 146 to the cylinder 14 that its initial position.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 18 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 100, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Controller 12 may infer an engine temperature based on an engine coolant temperature.

As described above, FIG. 1 shows only one cylinder of a multi-cylinder engine. As such, each cylinder may similarly include its own set of intake/exhaust valves, fuel injector(s), spark plug, etc. It will be appreciated that engine 100 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

In some examples, vehicle 15 may be a hybrid vehicle with multiple sources of torque available to one or more vehicle wheels 55. In other examples, vehicle 15 is a conventional vehicle with only an engine. In the example shown, vehicle 15 includes engine 100 and an electric machine 52. Electric machine 52 may be a motor or a motor/generator. Crankshaft 140 of engine 100 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from an energy storage device 58 (herein, battery 58) to provide torque to vehicle wheels 55. Electric machine 52 may also be operated as a generator to provide electrical power to charge battery 58, for example during a braking operation. In some examples, the electric machine 52 may be coupled to the turbine 176, as will be described in greater detail below.

The controller 12 receives signals from the various sensors of FIG. 2 and employs the various actuators of FIG. 2 to adjust engine operation based on the received signals and instructions stored on a memory of the controller. For example, adjusting a rotational speed and direction of the turbine 176 may include adjusting a signal provided to an actuator of the turbine 176 sent by the controller 12. In some examples, the rotational speed and direction of the turbine 176 are adjusted in response to one or more of a cold-start and pressures of the intake and exhaust passages. Thus, the turbine 176, and therefore the compressor 174, may be rotated in forward and reverse directions, wherein the forward direction results in boost flowing to the engine 100 and where the reverse direction results in increased exhaust backpressure and manifold pressure decreasing. Turning now to FIG. 3, it shows a method 300 for adjusting air and vacuum flow to the second cylinder group during some engine operating parameters. Instructions for carrying out method 300 may be executed by a controller based on instructions stored on a memory of the controller and in conjunction with signals received from sensors of the engine system, such as the sensors described above with reference to FIG. 2. The controller may employ engine actuators of the engine system to adjust engine operation, according to the methods described below.

The method 300 begins at 302, which may include determining, estimating, and/or measuring current engine operating parameters. Current engine operating parameters may include, but are not limited to, one or more of a primary throttle position, engine temperature, engine speed, manifold pressure, vehicle speed, exhaust gas recirculation flow rate, and air/fuel ratio.

The method may proceed to 304, which may include determining if the second cylinder group is deactivated. As described above, the second cylinder group may be deactivated in response to an engine load being less than a threshold load. The second cylinder group may include cylinders 102 and 103 of FIG. 1. The threshold load may be based on a percentage of a total load of the engine. For example, if a current load is equal to 50% or less of the total load of the engine, then the second cylinder group may be deactivated. At any rate, if the second cylinder group is not deactivated, then the method 300 may proceed to 306 to maintain current engine operating parameters and does not close the exhaust and intake throttles associated with only the second cylinder group. The exhaust and intake throttles associated with only the second cylinder group may be used similarly to shut-off element 10*a* and outlet-side shut-off element 10*b* of FIG. 1.

If the second cylinder group is deactivated, then the method 300 may proceed to 308 which may include closing the exhaust throttle and secondary throttle associated with the second cylinder group. Air in the second cylinder group intake and outlet passages may be hermetically sealed from upstream portions of the intake system and downstream portions of the exhaust system. As such, the second cylinder group its intake and outlet passages may be hermetically sealed from the primary intake and exhaust passages. In this way, no more intake air may flow to the second cylinder group and no exhaust gas may be flow from the second cylinder group to a turbine, ambient atmosphere, or remainder of an exhaust system.

The method 300 may proceed to 310, which may include flowing vacuum to intake and exhaust lines associated with the second group. Air and exhaust gases trapped between the intake and exhaust throttles of the second group may be sucked out by a vacuum generating device, negative pressure device, or the like. By sucking the gases out of the second cylinder group, pumping losses therein may be reduced and/or eliminated. Flowing the vacuum may include moving the shut-off elements 11*a*' and 11*b*' to more open positions. In some examples, the vacuum generating device may be a brake booster, EGR valve, or other device which consumes and/or generates vacuum to operate. Additionally or alternatively, a vacuum generating device, such as a primary throttle (e.g., throttle 162 of FIG. 1), may comprise one or more features shaped to generate a vacuum in the intake based on its position. As such, the gases from the second cylinder group may flow to the first cylinder group and be combusted therein.

Additionally or alternatively, the first cylinder group may suck the gases from the second cylinder group via a negative pressure generated by piston oscillation. More specifically, intake strokes of pistons of the first cylinder group may be used to suck the gases from the second cylinder group, wherein the gases may be used for combustion. A control valve or check valve may be arranged in a passage fluidly coupling the first cylinder group to the second cylinder group. The control valve or check valve may open in response to a pressure of the first cylinder group being less than a pressure of the second cylinder group. Operating parameters of the first cylinder group may be adjusted to account for receiving the intake air and exhaust gases of the second cylinder group. The adjustments may include adjusting a fuel injection timing or volume, spark timing, EGR flow rate, throttle position, and air/fuel ratio. For example, the EGR flow rate may decrease in response to receiving the gases from the second cylinder group.

In one example, additionally or alternatively, the first cylinder group may be a first vacuum source corresponding to a first vacuum passage (e.g., vacuum line 11*a*) fluidly coupled to a portion of the second cylinder group intake passage between the second cylinder group and the secondary throttle. A different, second vacuum source, such as the primary throttle, brake booster, EGR valve, may correspond to a second vacuum passage fluidly coupled to a portion of the second cylinder group exhaust passage between the second cylinder group and the exhaust throttle. In this way, the first cylinder group may be a vacuum resource for the second cylinder group, where the first cylinder group only sucks intake air and does not suck exhaust gas.

The method 300 may proceed to 312, which may include determining if the second group is reactivated. If the second cylinder group is not reactivated and the cylinders are still deactivated, then the method 300 may proceed to 314, which may include maintaining exhaust and intake throttles closed and keep providing vacuum to the second cylinder group. In some examples, vacuum flow to the second cylinder group may be terminated if a pressure of the second cylinder group is equal to a pressure of the vacuum source.

If the second cylinder group is reactivated, then the method 300 may proceed to 316, which may include stopping flow of the vacuum to the intake and exhaust lines of the second cylinder group. This may include actuating a control valve to a closed position, such as the shut-off elements 11*a*, 11*b* in negative pressure lines as shown in FIG. 1.

The method 300 may proceed to 318, which may include opening the exhaust and secondary intake throttles of the second cylinder group such that air may flow to the second cylinder group and exhaust gas may flow out of the second cylinder group.

The method 300 may proceed to 320, which may include fueling the cylinders of the second cylinder group. This may further include adjusting a position of the primary throttle.

Turning now to FIG. 4, it shows an engine operating sequence 400 illustrating the method 300 of FIG. 3 being executed in combination with the internal combustion engine of FIGS. 1 and 2. Plot 405 depicts an activity of the second cylinder group, plot 410 depicts a position of the secondary throttle, plot 415 depicts a position of an exhaust throttle, plot 420 depicts a second cylinder group pressure, and plot 425 depicts if vacuum is flowing to the second cylinder group.

Prior to t1, the second cylinder group is active (plot 405). Thus, the cylinders of the second cylinder group may continue to combust. Secondary throttle and exhaust throttle are both in open positions (plots 410 and 415, respectively). The open and closed positions may correspond to fully open and fully closed positions, the fully open position allowing a maximum amount of gas flow and the fully closed position allowing a minimum amount of gas flow or substantially no gas flow. The secondary throttle and exhaust throttle may be actuated to positions between the fully closed and fully open positions to further meter a gas flow rate. A second cylinder group pressure is relative high as intake air and exhaust gas reside therein (plot 420). A vacuum flow is off (plot 425).

At t1, the second cylinder group is deactivated. In response, the secondary throttle position and the exhaust throttle position may begin to be adjusted toward the fully closed positions. The second cylinder group pressure may remain relatively high as gases in the second cylinder group exhaust and intake passages are trapped therein. Vacuum flow remains off.

After t1 and between t2, vacuum may begin to flow to the second cylinder group intake and exhaust passages. As a result, the second cylinder group pressure may begin to decrease to a relatively low pressure. The vacuum flow may continue to flow to the second cylinder group intake and exhaust passages until a pressure of the second cylinder group is substantially equal to the vacuum flow. Gas flow to and from the second cylinder group may be substantially prevented as the secondary throttle and the exhaust throttle remain in the fully closed position. The second cylinder group may remain deactivated, where its full efficiency is increased due to both the higher load placed on the operating cylinders (e.g., first cylinder group) and prevention of pumping losses experienced in the second cylinder group.

In some examples, additionally or alternatively, the vacuum may flow to only the second cylinder group exhaust passage and may not flow to the second cylinder group intake passage. In this way, gases from the second cylinder group may be removed via the vacuum flowing to the second cylinder group exhaust passage and via a vacuum generated by the cylinders of the second cylinder group. More specifically, the cylinders of the second cylinder group may expel gases arranged in the second cylinder group intake passages to the second cylinder group exhaust passage, where the gases may be sucked out via the negative-pressure device.

At t2, the vacuum flow is deactivated. The secondary throttle and the exhaust throttle are moved out of the fully closed position to a more open position. This may allow the second cylinder group pressure to increase in anticipation of the cylinders of the second cylinder group being activated. The second cylinder group is activated and the second cylinder group pressure increases to a relatively high pressure.

In this way, gases in deactivated cylinders may be expelled via a vacuum source. The technical effect of removing gases from the deactivated cylinders may be to increase fuel efficiency during the cylinder deactivation. Additionally, various preexisting vacuum sources may be fluidly coupled to the passages of the deactivated cylinders, decreasing manufacturing costs and packaging restraints.

An example of an internal combustion engine comprises at least one cylinder head with at least two cylinders, in which each cylinder of the two cylinders has at least one inlet opening fluidly coupled to an intake line for the supply of fresh air via an intake system, each cylinder has at least one outlet opening fluidly coupled to an exhaust line for the discharge of the exhaust gases via an exhaust-gas discharge system, the at least two cylinders form a first cylinder group and a second cylinder group, the first cylinder group comprising at least a first cylinder and the second cylinder group comprising at least a second cylinder different than the first, where the first cylinder is not switchable and the second cylinder is switchable, the intake system comprising a primary shut-off element configured to adjust fresh air flow to each of the first and second cylinder groups and a secondary shut-off element configured to adjust fresh air flow to only the second cylinder group, via which the supply of fresh air to the at least one cylinder of the second group can be stopped, a second cylinder group exhaust line is equipped with at least one exhaust shut-off element configured to adjust exhaust gas flow from the second cylinder group exhaust line to the exhaust-gas discharge system; and a negative-pressure source fluidly coupled to at least the second cylinder group exhaust line, where a negative-pressure line fluidly coupling the negative pressure source is connected to the second cylinder group exhaust line at a position between the exhaust shut-off element and the second cylinder.

A first example of the internal combustion engine further comprises where the primary shut-off element is arranged in a primary intake line, the primary intake line dividing downstream of the primary shut-off element to form a first cylinder group intake line and a second cylinder group intake line, and where the secondary throttle is arranged in the second cylinder group intake line. A second example of the internal combustion engine, optionally including the first example, further comprises where the negative-pressure line is a first negative-pressure line, and where a second negative-pressure line fluidly couples the negative-pressure source to a portion of the second cylinder group intake line between the secondary shut-off element and the second cylinder, and where each of the first negative-pressure line and the second negative-pressure line comprises first and second control valves, respectively. A third example of the internal combustion engine, optionally including the first and/or second examples, further includes where a controller with computer-readable instructions stored thereon that when executed enable the controller to trap gases between the exhaust shut-off element and the second shut-off element when the second cylinder is deactivated; and the instructions further include where the first and second control valves are adjusted to more open positions in response to the second cylinder being deactivated. A fourth example of the internal combustion engine, optionally including one or more of the first through third examples, further includes where the negative-pressure source comprises one or more of a vacuum pump, negative-pressure region of the intake system, first cylinder, brake booster, or vacuum-actuated valve.

An example of a system comprises an engine comprising a first cylinder group having at least a first cylinder and a second cylinder group having at least a second cylinder, where only the second cylinder is deactivateable, a primary intake throttle arranged in a primary intake passage, the primary throttle shaped to adjust air flow to the first and second cylinder groups, and where the primary intake passage divides into a first cylinder group intake passage and a second cylinder group intake passage downstream of the primary throttle, a secondary intake throttle arranged in the second cylinder group intake passage, the secondary intake throttle shaped to adjust air flow to only the second cylinder, an exhaust throttle arranged in a second cylinder group exhaust passage, the exhaust throttle shaped to only adjust exhaust flow out of the second cylinder, and where a first cylinder group exhaust passage is fluidly coupled to the first cylinder, where the first cylinder group exhaust passage merges with the second cylinder group exhaust passage downstream of the exhaust throttle, a vacuum source fluidly coupled to a portion of the second cylinder group exhaust passage between the exhaust throttle and the second cylinder via a vacuum line comprising a control valve, and a controller with computer-readable instructions stored on non-transitory memory thereof that when executed enable the controller to adjust the control valve and flow vacuum from the vacuum source to the second cylinder group exhaust passage in response to the second cylinder being deactivated. A first example of the system further includes where the instruction further include adjusting the secondary intake throttle and the exhaust throttle to closed positions in response to the second cylinder being deactivated. A second example of the system, optionally including the first example, further includes where the vacuum source is a first vacuum source and where the vacuum line is a first vacuum line, further comprising a second vacuum line extending from a second vacuum source, the second vacuum line fluidly coupling the second vacuum source to a portion of the second cylinder group intake passage between the second cylinder and the secondary intake throttle. A third example of the system, optionally including the first and/or second examples, further includes where the first vacuum source and the second vacuum source are different, and where the first vacuum source and the second vacuum source are a brake booster, an EGR valve, the primary throttle, and the first cylinder. A fourth example of the system, optionally including one or more of the first through third examples, further includes where the first vacuum source is the brake booster or the EGR valve and where the second vacuum source is the primary throttle or the first cylinder. A fifth example of the system, optionally including one or more of the first through fourth examples, further includes where exhaust gases from the first cylinder group mix with exhaust gases from the second cylinder group downstream of the exhaust throttle. A sixth example of the system, optionally including one or more of the first through fifth examples, further includes where the first cylinder group receives an amount of air flow greater than or equal to the second cylinder group. A seventh example of the system, optionally including one or more of the first through sixth examples, further includes where the primary throttle generates vacuum as air flows around or through it.

An embodiment of a method comprises deactivating only a second cylinder group of an engine, the second cylinder group comprising at least one cylinder different than at least one cylinder in a first cylinder group, closing intake and exhaust throttles configured to adjust gas flow to and from only the second cylinder group, respectively; and removing gases trapped between the intake and exhaust throttles via a vacuum source. A first example of the method further includes where a primary intake passage housing a primary intake throttle shaped to adjust intake air flow to each of the first cylinder group and second cylinder group, and where the primary intake passage divides downstream of the primary intake throttle to form a first cylinder group intake passage and a second cylinder group intake passage, and where intake air flows freely in the first cylinder group intake passage and intake air flow is adjusted via the intake throttle in the second cylinder group intake passage. A second example of the method, optionally including the first example, further includes where the first cylinder group comprises a first cylinder group exhaust passage fluidly separated from a second cylinder group exhaust passage of the second cylinder group, and where the exhaust throttle is arranged in the second cylinder group exhaust passage. A third example of the method, optionally including the first and/or second examples, further includes where removing gases further comprises adjusting a position of a control valve in a vacuum line fluidly coupling the vacuum source to a portion of the second cylinder group exhaust passage between the second cylinder and the exhaust throttle. A fourth example of the method, optionally including one or more of the first through third examples, further includes where the vacuum line is a first vacuum line and the control valve is a first control valve, further comprising a second vacuum line different than the first vacuum line, the second vacuum line comprising a second control valve, the second control valve adjusted independently of the first. A fifth example of the method, optionally including one or more of the first through fourth examples, further includes where the first cylinder group and the second cylinder group comprise an equal number of cylinders, and where the first cylinder group comprises at least a first cylinder and the second cylinder group comprises at least a second cylinder. A sixth example of the method, optionally including one or more of the first through fifth examples, further includes where the vacuum source is one or more of a vacuum pump, a brake booster, an EGR valve, and the first cylinder.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An internal combustion engine, comprising:
 at least one cylinder head with at least two cylinders, in which each cylinder of the at least two cylinders has at least one inlet opening fluidly coupled to an intake line for supply of fresh air via an intake system, each cylinder has at least one outlet opening fluidly coupled to an exhaust line for discharge of exhaust gases via an exhaust-gas discharge system, a first cylinder group comprising a first cylinder of the at least two cylinders and a second cylinder group comprising at least a second cylinder of the at least two cylinders, wherein the first cylinder group is not deactivatable and the second cylinder group is deactivatable;
 the intake system comprising a primary shut-off element configured to adjust fresh air flow to each of the first and second cylinder groups and a secondary shut-off element configured to adjust fresh air flow to only the second cylinder group, via which the supply of fresh air to the second cylinder group is selectively stopped;
 a second cylinder group exhaust line is equipped with at least one exhaust shut-off element configured to adjust exhaust gas flow from the second cylinder group exhaust line to the exhaust-gas discharge system; and
 a negative-pressure source is fluidly coupled to at least the second cylinder group exhaust line via a first negative-pressure line, wherein the first negative-pressure line is fluidly connected to the second cylinder group exhaust line at a position between the exhaust shut-off element and the second cylinder group.

2. The internal combustion engine of claim 1, wherein the primary shut-off element is arranged in the intake line, the intake line dividing downstream of the primary shut-off element to form a first cylinder group intake line and a second cylinder group intake line, and wherein the secondary shut-off element is arranged in the second cylinder group intake line.

3. The internal combustion engine of claim 2, wherein a second negative-pressure line fluidly couples the negative-pressure source to a portion of the second cylinder group intake line between the secondary shut-off element and the second cylinder group, and wherein the first negative-pressure line and the second negative-pressure line comprise first and second control valves, respectively.

4. The internal combustion engine of claim 1, further comprising a controller configured to:
 trap gases between the exhaust shut-off element and the secondary shut-off element in second cylinder group intake passages, exhaust passages, and cylinders when the second cylinder group is deactivated; and
 adjust the first and second control valves to more open positions in response to the second cylinder group being deactivated.

5. The internal combustion engine of claim 1, wherein the negative-pressure source comprises one or more of a vacuum pump, a negative-pressure region of the intake system, the first cylinder, a brake booster, and a vacuum-actuated valve.

6. A system, comprising:
 an engine comprising a first cylinder group having a first cylinder and a second cylinder group having a second cylinder, where only the second cylinder group is deactivatable;
 a primary intake throttle arranged in a primary intake passage, the primary intake throttle shaped to adjust air flow to the first and second cylinder groups, and wherein the primary intake passage divides into a first cylinder group intake passage and a second cylinder group intake passage downstream of the primary intake throttle;
 a secondary intake throttle arranged in the second cylinder group intake passage, the secondary intake throttle shaped to adjust air flow to only the second cylinder group;
 an exhaust throttle arranged in a second cylinder group exhaust passage, the exhaust throttle shaped to only adjust exhaust flow out of the second cylinder group, and wherein a first cylinder group exhaust passage is fluidly coupled to the first cylinder group, wherein the first cylinder group exhaust passage merges with the second cylinder group exhaust passage downstream of the exhaust throttle;
 a first vacuum source fluidly coupled to a portion of the second cylinder group exhaust passage between the exhaust throttle and the second cylinder group via a first vacuum line comprising a control valve; and
 a controller configured to:
  adjust the control valve and apply negative pressure from the first vacuum source to the second cylinder group exhaust passage in response to the second cylinder group being deactivated.

7. The system of claim 6, wherein the controller is further configured to adjust the secondary intake throttle and the exhaust throttle to closed positions in response to the second cylinder group being deactivated.

8. The system of claim 6, further comprising a second vacuum line fluidly coupling a second vacuum source to a portion of the second cylinder group intake passage between the second cylinder group and the secondary intake throttle.

9. The system of claim 8, wherein the first vacuum source and the second vacuum source are different from each other and selected from the group consisting of a brake booster, an EGR valve, the primary intake throttle, and the first cylinder.

10. The system of claim 9, wherein the first vacuum source is the brake booster or the EGR valve and where the second vacuum source is the primary intake throttle or the first cylinder.

11. The system of claim 6, wherein exhaust gases from the first cylinder group mix with exhaust gases from the second cylinder group downstream of the exhaust throttle.

12. The system of claim 6, wherein the first cylinder group receives an amount of air flow greater than or equal to an amount of air flow received by the second cylinder group.

13. The system of claim 6, wherein the primary intake throttle generates vacuum as air flows around or through the primary intake throttle.

14. A method for control of an engine with a first cylinder group and a second cylinder group, comprising;
 deactivating only the second cylinder group of the engine, the second cylinder group having different cylinders than the first cylinder group;
 closing intake and exhaust throttles configured to adjust gas flow to and from only the second cylinder group, respectively; and
 removing gases trapped between the intake and exhaust throttles via a vacuum pump.

15. The method of claim 14, further comprising a primary intake passage housing a primary intake throttle shaped to adjust intake air flow to each of the first cylinder group and the second cylinder group, and where the primary intake passage divides downstream of the primary intake throttle to form a first cylinder group intake passage and a second cylinder group intake passage, and wherein intake air flows freely in the first cylinder group intake passage and intake air flow is adjusted via the primary intake throttle arranged in the second cylinder group intake passage.

16. The method of claim 14, wherein the first cylinder group comprises a first cylinder group exhaust passage fluidly separated from a second cylinder group exhaust passage of the second cylinder group, and wherein the exhaust throttle is arranged in the second cylinder group exhaust passage.

17. The method of claim 16, wherein the removing of gases further comprises adjusting a position of a first control valve in a first vacuum line fluidly coupling the vacuum pump to a portion of the second cylinder group exhaust passage between the second cylinder group and the exhaust throttle.

18. The method of claim 17, further comprising a second vacuum line comprising a second control valve, the second control valve adjusted independently of the first control valve.

19. The method of claim 14, wherein the first cylinder group and the second cylinder group comprise an equal number of cylinders.

20. The method of claim 19, wherein a vacuum source is one or more of a brake booster, an EGR valve, and the first cylinder.

* * * * *